United States Patent [19]

Yezrielev et al.

[11] Patent Number: 5,681,906

[45] Date of Patent: Oct. 28, 1997

[54] THERMOSET COATING COMPOSITIONS HAVING IMPROVED HARDNESS

[75] Inventors: Albert Ilya Yezrielev; Vijay Swarup, both of Houston, Tex.; Konstantinos R. Rigopoulos, Baton Rouge, La.

[73] Assignee: Exxon Chemical Patents Inc., Houston, Tex.

[21] Appl. No.: 424,205

[22] Filed: Apr. 19, 1995

[51] Int. Cl.$^6$ .................. C08L 61/20; C08L 61/28; C08L 67/00

[52] U.S. Cl. .................. 525/450; 525/451; 525/534; 525/400; 525/408; 525/418; 525/437; 525/444; 525/509; 525/519

[58] Field of Search .................. 525/451, 437, 525/444, 400, 408, 534, 450, 418, 509, 519

[56] References Cited

U.S. PATENT DOCUMENTS

| | | | |
|---|---|---|---|
| 3,409,579 | 11/1968 | Robbins | 260/30.4 |
| 3,789,044 | 1/1974 | Taft et al. | 260/18 TN |
| 3,836,491 | 9/1974 | Taft et al. | 260/22 TN |
| 4,031,068 | 6/1977 | Cantor | 260/79.3 R |
| 4,130,549 | 12/1978 | Ueno et al. | 528/93 |
| 4,331,782 | 5/1982 | Linden | 525/173 |
| 4,343,839 | 8/1982 | Blegan | 427/340 |
| 4,365,039 | 12/1982 | Blegan | 524/773 |
| 4,374,167 | 2/1983 | Blegan | 428/141 |
| 4,374,181 | 2/1983 | Blegan | 428/423.3 |
| 4,877,838 | 10/1989 | Toman | 525/107 |
| 4,888,441 | 12/1989 | Calbo, Jr. et al. | 560/198 |
| 4,922,002 | 5/1990 | Calbo, Jr. et al. | 528/286 |
| 5,166,289 | 11/1992 | Yezrielev et al. | 525/443 |
| 5,210,155 | 5/1993 | Yezrielev et al. | 525/442 |
| 5,235,006 | 8/1993 | Jones et al. | 525/510 |
| 5,239,018 | 8/1993 | Yezrielev et al. | 525/418 |
| 5,322,884 | 6/1994 | Wellman et al. | 524/601 |
| 5,326,831 | 7/1994 | Yezrielev et al. | 525/437 |
| 5,334,652 | 8/1994 | Wellman et al. | 524/601 |
| 5,334,671 | 8/1994 | Yezrielev et al. | 525/443 |
| 5,453,469 | 9/1995 | Yezrielev et al. | 525/418 |
| 5,458,920 | 10/1995 | Yezrielev et al. | 427/385.5 |

FOREIGN PATENT DOCUMENTS

| | | |
|---|---|---|
| 2809768 | 9/1978 | Germany . |
| 05155840 | 6/1993 | Japan . |
| 1290848 | 9/1972 | United Kingdom . |

OTHER PUBLICATIONS

Stumpe et al., "Deactivation of Excited States in Polyurethanes by Energy Transfer to Salicyclic Acid Derivatives and its Application to the Photo–stabilisation of Polyurethanes", Polymer Degradation and Stability 17 (1987) 103–115.

Primary Examiner—W. Robinson H. Clark
Attorney, Agent, or Firm—Richard A. Jordan; John F. Hunt

[57] ABSTRACT

The present invention provides for amino-crosslinkable coating formulations based on a mixture of a di- or polyhydroxy functional polymeric component selected from the group consisting of diesters, polyesters, alkyd polymers, acrylic polymers and polycarbonate polymers, a crosslinking agent such as a methylol (alkoxymethyl) amino crosslinking agent, and a reactive additive which is the ester reaction product of a phenol carboxylic acid, preferably para-hydroxybenzoic acid, and an epoxy compound selected from glycidyl ethers, glycidyl esters, linear epoxies and aromatic epoxies. The crosslinkable compositions of this invention may be used to prepare curable coating and paint formulations, and also may contain other ingredients such as a crosslinking catalyst, fillers, pigments and the like. When cured, the coatings of this invention exhibit improved physical and chemical properties when compared with cured coatings which do not contain the ester reaction product additive.

42 Claims, No Drawings

THERMOSET COATING COMPOSITIONS HAVING IMPROVED HARDNESS

BACKGROUND OF THE INVENTION

1. Field of the Invention

The present invention relates to crosslinkable polymer compositions, to solid crosslinked polymer compositions prepared therefrom, and to methods for improving coating properties of films and surface coatings based thereon.

2. Description of Related Art

Thermosettable coating formulations, particularly alkyd, acrylic, polyester or diester-based coating compositions, are often the materials of choice for application to various substrates, particularly metal substrates, as a paint or a protective coating. Such coatings can be formulated to provide a good balance of properties such as hardness, flexibility, solvent resistance, corrosion resistance, weatherability and gloss. The enhancement of these properties depends on many factors including type, molecular weight, monomer composition, and glass transition temperature (Tg) of the resin; type and amount of the crosslinker; curing conditions; curing catalysts; pigments; fillers and additives. Variations of these parameters can be used to create a wide range of differences in film properties to fit requirements for a number of diverse applications. However, it is not always possible to optimize all of the desirable properties simultaneously.

The hardness of thermoset coating compositions can usually be increased by either providing a resin monomer composition having high glass transition temperature or by increasing the crosslink density.

The achievement of increased hardness by increasing polymer Tg gives rise to polymers having increased viscosity which in turn may require the use of larger than desirable quantities of solvent to form solutions suitable for coating processes.

On the other hand, an increase in crosslink density of di- or polyhydroxy-containing polymers containing a multi-functional crosslinking agent such as a multi-alkoxy methyl amino crosslinking agent may be achieved by increasing the concentration of the hydroxy functional groups present in the polymer. For example, polyester polymers made by condensing a dibasic acid and an excess of diol and containing terminal hydroxyl groups and having a low molecular weight contain a greater number of terminal hydroxy groups available as crosslinking sites than do the higher molecular weight materials. Thus, an increase in hardness of such resins can be achieved simultaneously with a reduction in viscosity and a reduction of the volatile solvent content of coating and paint formulations.

However, a very high degree of crosslinking tends to seriously reduce the flexibility and may also affect other properties of the cured coating. Also, the use of high levels of crosslinking agents needed for a high degree of crosslinking results in the formation of a large amount of volatile by-products of the crosslinking reaction which is undesirable in such coating formulations.

One technique for improving the hardness and other properties of such coatings is the inclusion in the curable composition of from about 1 to 60 wt % of a bis phenolic compound, e.g., bisphenol-A, as disclosed in U.S. Pat. No. 5,166,289. The polyhydric phenol component participates in the crosslinking reaction involving the base resin and the amino crosslinking agent, thereby providing cured coatings of increased hardness.

However, the bisphenols tend to be poorly soluble in solvents normally used in such compositions, and additional solvent quantities may be needed to provide the requisite solubility. The inclusion of large amounts of solvent to provide more workable viscosities also increases the content of volatiles present in the composition, which is undesirable.

U.S. Pat. No. 4,331,782 discloses phenol-functional polyester resins which are vapor-curable using isocyanate crosslinking agents. The phenol-functional resins are prepared by first forming an ester-alcohol adduct of a hydroxybenzoic acid and an epoxy compound, and then forming the polyester by a polyesterification reaction including the adduct, a polyol and a dibasic acid as reactants. The polyester resins are characterized as being capped by the phenol-functional adduct.

SUMMARY OF THE INVENTION

The present invention provides for crosslinkable coating formulations based on a mixture of a di or polyhydroxy functional poly(oligo)meric component selected from the group consisting of di(poly)esters, polyesters, alkyd polymers, acrylic polymers, polyethers, polycarbonate polymers and poly(oligo)mers which contain a combination of two or more of ester, ether, carbonate, acrylic and alkyd moieties in their structure; a crosslinking agent and a reactive additive which is the ester reaction product of a phenol carboxylic acid; and an epoxy compound. Preferred ester reaction products have the general formula A:

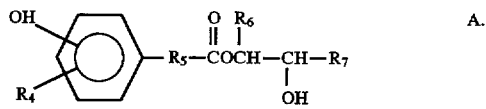

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical which may incorporate another phenol or aliphatic hydroxyl, ester, ether and/or carbonate group in its structure, $R_6$ is hydrogen or a $C_1$ to $C_{20}$ organic radical or a direct bond which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms or an aromatic group containing 6 to 20 carbon atoms, $R_{10}$ is a primary, secondary or tertiary aliphatic group containing 4 to 20 carbon atoms or an aromatic group containing 6 to 20 carbon atoms, and $R_{11}$ is a $C_2$ to $C_{20}$ organic radical which may form with $R_6$ part of a 5 or 6 carbon atom cyclic ring structure.

More particularly, the present invention provides a crosslinkable coating composition comprising a mixture of:

(a.) a di- or polyhydroxy functional oligomeric or polymeric component selected from the group consisting of a polyester, a diester of a di(poly)ol and a dicarboxylic acid, an alkyd resin, a polyether, an acrylic resin and a polycarbonate resin, said polymeric component further characterized as having a number average molecular weight within the range of about 250 to about 20,000;

(b.) an ester reaction product of a phenol carboxylic acid and an epoxy functional compound; and (c.) a methylol(alkoxymethyl)amino crosslinking agent present in an amount effective to crosslink the composition.

The crosslinkable compositions of this invention may be used to prepare curable coating and paint formulations having workable (sprayable) viscosities and reduced VOC content. The compositions may also contain other ingredients such as a crosslinking catalyst, fillers, pigments and the like. When cured, the coatings of this invention generally exhibit improved hardness properties when compared with cured coatings which do not contain the epoxy-ester reaction product additive. The presence of the additive also serves to eliminate the problem of coating softening when the coated substrate is baked for a prolonged period of time. These cured coatings also have good weatherability, good corrosion resistance and hydrolytic stability, enhanced oxidative and radiation stability, good solvent and sag resistance and good adhesion properties.

DETAILED DESCRIPTION OF THE INVENTION

The present invention is based on the fact that low molecular weight reactive additives of the invention, when they are mixed with hydroxy functional polymers and the preferred methylol (alkoxy methyl) amino curing agents, form crosslinkable compositions in which both the hydroxy functional polymers and the epoxy/phenol carboxylic acid reaction product participate in the crosslinking reaction at baking conditions. As a result, polymer structures, including highly crosslinked polymer structures, can be built at baking conditions with the use of very low molecular weight raw materials and low solvent quantities.

As indicated above, the oligomeric or polymeric component of the composition of this invention may comprise a di- or polyhydroxy functional polymer including a diester, a polyester, an alkyd polymer, an acrylic polymer, a polyether, a polycarbonate polymer, or mixtures of two or more of these materials.

Suitable diesters and polyesters are materials having the general formula I:

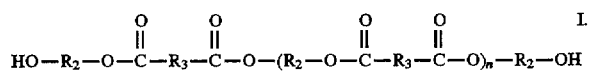

wherein n is 0 or an integer ranging from 1 to about 40, $R_2$ is a divalent aliphatic or cycloaliphatic radical containing from 2 to about 40 carbon atoms or a mixture of such radicals, and $R_3$ is a divalent aliphatic, cycloaliphatic or aromatic radical containing from 2 to about 40 carbon atoms, or a mixture of such radicals. Obviously, when n is 0 in formula I, a simple diester is represented. When n ranges from 1 to about 40, a polyester is represented.

In the more preferred embodiments of the invention, $R_2$ is the divalent residuum of a di(poly)ol containing from 2 to about 20 carbon atoms, more preferably from about 2 to 10 carbon atoms, and may also contain internal ester groups.

Some preferred examples of the diols are one or more of the following: neopentyl glycol; ethylene glycol; hexamethylenediol; 1,2-cyclohexanedimethanol; 1,3-cyclohexanedimethanol; 1,4-cyclohexanedimethanol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples of polyols include triols such as glycerine, timethylol ethane, trimethylol propane, pentaerythritol and the like.

$R_3$ in formula I above is the divalent residuum of a dicarboxylic acid having from 2 to abut 40 aliphatic carbon atoms, from about 5 to 40 cycloaliphatic carbon atoms or from 6 to about 40 aromatic carbon atoms, as well as mixtures of these acids. The carboxyl groups may be present in the form of anhydride groups, lactone groups, or equivalent ester forming derivatives such as the acid halide or methyl ester. The dicarboxylic acids or derivatives are preferably one or more of the following: phthalic anhydride, terephthalic acid, isophthalic acid, naphthalene dicarboxylic acids, adipic acid, succinic acid, glutaric acid, fumaric acid, maleic acid, cyclohexane dicarboxylic acid, azeleic acid, sebasic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Many commercially available polyesters are produced using a combination of aromatic and aliphatic dicarboxylic acids or a combination of cycloaliphatic and aliphatic dicarboxylic acids or combinations of all three types. However, where polyesters having low viscosity and low solvent content are desired, the most preferred acids used for the purposes of this invention are linear saturated or unsaturated aliphatic dicarboxylic acids having from 2 to 10 carbon atoms such as succinic, glutaric, adipic, and similar materials.

The acrylic polymers which may be used as a polymeric component in the present invention are acrylic copolymer resins. The acrylic copolymer resin is prepared from at least one hydroxy-substituted alkyl (meth)acrylate and at least one non-hydroxy-substituted alkyl (meth)acrylate. The hydroxy-substituted alkyl (meth)acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2-acryloxy propane; 2-hydroxypropyl acrylate; 3-hydroxypropylacrylate; 2,3-dihydroxypropylacrylate; 3-hydroxybutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,3-dihydroxypropyl methacrylate; 2-hydroxybutyl methacrylate; 3-hydroxybutyl methacrylate; 2-hydroxyethyl methacrylate; 4-hydroxybutylmethacrylate; 3,4-dihydroxybutyl methacrylate; 5-hydroxypentyl methacrylate; and 7-hydroxyheptyl methacrylate. The preferred hydroxy functional monomers for use in preparing the acrylic resins are hydroxy-substituted alkyl (meth)acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth) acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth)acrylate monomers which may be employed are alkyl (meth) acrylates. Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer resins used in the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, epoxy-modified acrylics and methacrylonitrile.

The acrylic copolymer preferably has a number average molecular weight not greater than 20,000, more preferably between about 500 and 6000, and most preferably between about 1000 and 5000.

Alkyd polymers which may be used as the polymeric component of the composition of this invention have a formula similar to formula I above except that $R_2$ is a divalent residuum of a triol with one hydroxyl group esterified with a fatty acid. Typical triols are glycerine, trimethylol ethane and like materials. These alkyd resins are oil modified polyester resins and are broadly the product of the reaction of a dihydric alcohol and a dicarboxylic acid or acid derivative and an oil, fat or carboxylic acid derived from such oil or fat which acts as a modifier. Such modifiers are typically drying oils. The polyhydric alcohol employed is suitably an aliphatic alcohol, and mixtures of the alcohols may also be employed. The dicarboxylic acid, or corresponding anhydrides, may be selected from a variety of aliphatic carboxylic acids or mixtures of aliphatic and aromatic dicarboxylic acids. Suitable acids and acid anhydrides include, by way of example, succinic acid, adipic acid, phthalic anhydride, isophthalic acid, trimellitic acid (anhydride) and bis 3,3',4,4'-benzophenone tetracarboxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is, a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic, and stearic and such unsaturated fatty acids as oleic, eracic, ricinoleic, linoleic and linolenic. Chemically, these fats and oils are usually mixtures of two or more members of the class. Alkyd resins made with saturated monocarboxylic acids and fats are preferable where improved weather resistance is of prime concern.

Polycarbonate oligomers or polymers which may be used in preparing the compositions of this invention are hydroxy terminated polycarbonates having the general formula II:

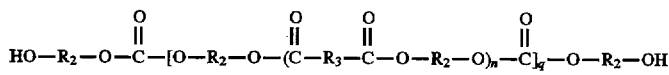

wherein q is an integer ranging from 1 to about 40, n is an integer ranging from 0 to 40, and $R_2$ and $R_3$ are as defined above. This formula includes diesters wherein n is 0 and q is 1 or greater which may be prepared by forming the condensation product of an aliphatic or cycloaliphatic diol having 2 to about 40 carbon atoms with a carbonic acid bis-aryl ester, such as diphenyl carbonate, followed by subsequent polycondensation reaction of this intermediate with said diol.

Also included in formula II are polyester diols lengthened via carbonate linkages and containing terminal carbonate groups linking the lengthened polyester diol backbone to terminal hydroxy-containing end groups, in which case n in formula II is equal to or greater than 1 and q is greater than 1.

A third category of polycarbonate within the scope of formula II are polyester diols containing terminal carbonate groups linking the polyester diol backbone to hydroxy-containing end groups, in which case q in formula II is equal to 1 and n is greater than 1. These materials may be prepared by forming the condensation product of a polyester diol with a carbonic acid bis-aryl ester, such as diphenyl carbonate, to form the polyester-diol bis-carbonic acid ester, followed by polycondensation of this precursor with a diol to form hydroxy terminated diesters.

The polymeric component may also comprise poly(oligo)mers which contain a combiantion of two or more of ester, ether, carbonate, acrylic and alkyd moieties in their structure. Examples of such materials are poly(ether)esters, poly(ether) carbonates and poly(ether) or poly(ester) acrylics.

The diesters and polyesters may be prepared by well known condensation processes using a molar excess of diol. Preferably the molar ratio of diol to dicarboxylic acid is p+1:p wherein p represents the number of moles of dicarboxylic acid. The reaction may be conducted in the absence of or presence of an aromatic or aliphatic solvent and in the absence of or presence of a suitable polycondensation catalyst as is known in the art.

The preferred number average molecular weight (Mn) of the polymers may generally range from about 250 up to about 20,000, more preferably from about 280 up to about 10,000, and most preferably from about 300 up to about 3,000 to 6,000. Glass transition temperatures (Tg) of these materials may generally range from as low as −40° C. up to +100° C. or higher.

The reactive additives used in the curable compositions of this invention are materials within the general structure of formula A above. The phenol carboxylic acid reactant used to prepare the ester reaction product of formula A has the general structure:

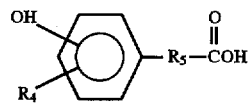

wherein $R_4$ and $R_5$ are as described above. Examples of suitable phenol carboxylic acids include hydroxybenzoic acids, acids where $R_5$ is alkylene such as phenyl acetic acid, hydroxy phenyl propionic acid, hydroxyphenyl stearic acid, and acids wherein $R_5$ encompasses additional phenol functionality such as 4,4-bis hydroxyphenyl pentanoic acid and the like. In a preferred embodiment of the invention, $R_4$ in formula A is hydrogen, $R_5$ is a direct bond, $R_6$ is hydrogen and $R_7$ is $CH_2OH$, a hydrocarbon moiety or an organic moiety containing ester or ether groups and containing from 1 to about 20 carbon atoms, more preferably from about 3 to 20 carbon atoms.

A particular advantage with the use of the reactive additives of this invention as compared, for example, with the bisphenol-A type materials disclosed in U.S. Pat. No. 5,166,289 is that the present materials are generally more soluble in the solvents conventionally used in paint formulations and are in many cases more compatible with other ingredients present in the formulation. Thus, formulations of low viscosity which are either solvent free or contain lesser amounts of solvent can be prepared, thereby lowering the content of volatile organic compounds (VOC) present in the formulation.

The preferred reactive additives used in the curable compositions of this invention are the ester reaction products of a hydroxybenzoic acid and an epoxy compound. Suitable hydroxybenzoic acids include ortho-hydroxybenzoic acid (salicylic acid), meta-hydroxybenzoic acid and para-hydroxybenzoic acid (PHBA), with para-hydroxybenzoic acid being most preferred.

The epoxy compound may be selected from the group consisting of glycidyl esters, glycidyl alcohols, glycidyl ethers, linear epoxies and aromatic epoxies. These include glycidol, glycidyl ethers of the structure:

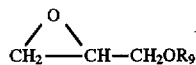

glycidyl esters of the structure:

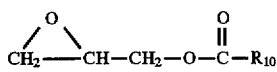

glycidyl or oxirane compounds having the structure:

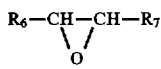

and cycloaliphatic epoxy compounds having the structures:

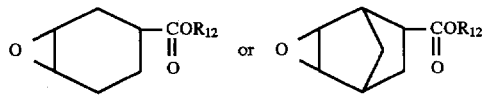

wherein $R_{12}$ is an organic radical having 1–12 carbon atoms which can include ether, ester, hydroxyl or epoxy groups, as well as other cycloiphatic compounds having the structures:

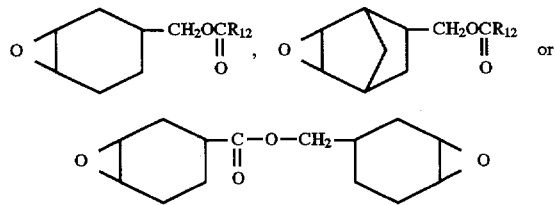

Other epoxy materials include epoxidized alpha-olefins and bis aromatic epoxies such as the reaction product of bisphenol A or F with epichlorohydrin.

Suitable epoxy compounds particularly include monoepoxides containing a terminal glycidyl group or polyepoxides containing internal oxirane or glycidyl groups or terminal glycidyl groups. Suitable epoxy compounds include glycidol, glycidyl acrylate or methacrylate monomers, alkyl glycidyl ether monomers, and low molecular weight copolymers of one or more of these monomers with one or more ethylenically unsaturated monomers such as acrylates, methacrylates, vinyl aromatic monomers and the like.

Other suitable epoxy compounds include the ester reaction products of epichlorohydrin with mono- or dibasic aliphatic or aromatic carboxylic acids or anhydrides containing from about 1–20 carbon atoms. Inclusive of such acids are aliphatic acids such as acetic, butyric, isobutyric, lauric, stearic, maleic and myristic acids and aromatic acids such as benzoic, phthalic, isophthalic and terephthalic acids as well as the corresponding anhydrides of such acids.

Preferred such acids are primary, secondary or tertiary aliphatic carboxylic acids containing from 5 to 13 carbon atoms. A preferred epoxy compound of this type is the glycidyl ester of a mixed aliphatic, mostly tertiary, mono carboxylic acid with an average of 9 to 11 carbon atoms such as available from Exxon Chemical Co., under the trade name GLYDEXX® or from Shell Chemical Co. under the trade name CARDURA® E ester.

Still other epoxy compounds include glycidyl ether reaction products of epihalohydrin with aliphatic or aromatic alcohols or polyols containing from about 1 to 20 carbon atoms. Suitable alcohols include aromatic alcohols such as benzyl alcohol; aromatic polyols such as bisphenol, bisphenol A, bisphenol F, phenolphthalein and novolac resins; aliphatic alcohols such as ethanol, isopropanol, isobutyl alcohol, hexanol, stearyl alcohol and the like; and aliphatic polyols such as ethylene glycol, propylene glycol and butylene glycol.

Other epoxy compounds which may be used include the mono-epoxides of $C_8$ to $C_{20}$ alpha mono-olefins.

The epoxy compound may also comprise epoxidized fatty compounds. Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines and epoxidized fatty alcohols. Suitable alicyclic epoxide and polyepoxide materials include dicyclopentadiene diepoxide, limonene diepoxide, and the like. Additional useful epoxides include for example, vinyl cyclohexane dioxide, bis(3,4-epoxycyclohexyl)adipate, 3,4-epoxycyclohexylmethyl-3,4-epoxy-cyclohexane carboxylate and 2-(3,4-epoxycyclohexyl-5,5-spiro-3,4-epoxy) cyclohexane-metadioxane.

The preferred hydroxybenzoic acid/epoxy reaction product of this invention may be formed by reacting the hydroxybenzoic acid and the epoxy compound, optionally in a solvent therefor, at a temperature ranging from about 90° to about 120° C. to initiate such reaction. Once the reaction is initiated, such reaction is exothermic, and the reaction temperature can rise to a temperature of about 150° to 175° C. usually without application of external heat. The reaction temperature then is maintained at about 150° to 170° C. (and preferably less than about 200° C.) until the reaction has been determined to be substantially complete.

Reaction products of reduced discoloration can be produced by control of the maximum temperature of the exothermic reaction. This can be achieved by a staged and/or incremental addition of one of the reactants, e.g. the epoxy reactant, so that the reaction temperature is maintained at a temperature of about 150° C. or below. The remainder of that reactant may then be added in stages or continuously while maintaining the reaction temperature below about 150° C. This process modification gives rise to reaction products having lower Color Index values.

Approximately stoichiometric quantities of the epoxy compound and the phenol carboxylic acid are used in the reaction, although a slight molar excess of epoxy may be necessary to drive the reaction to completion.

The phenol carboxylic acid/epoxy reaction product may be blended with the base polymer at a blend ratio of from 1 to about 60% by weight of reaction product, based on the weight of base polymer and the crosslinking agent taken together. More preferred compositions contain the reaction product at a level of from about 2 to about 40% by weight, and most preferably at a level of from about 3 to 20% by weight, based on the weight of the base polymer and crosslinking agent taken together.

The preferred methylol(alkoxymethyl)amino crosslinking agents used in the present invention are well known commercial products, and are generally made by the reaction of di(poly)amide(amine) compounds with formaldehyde and, optionally, a lower alcohol.

Examples of suitable amino-crosslinking resins include one or a mixture of the following materials:

Melamine based resins

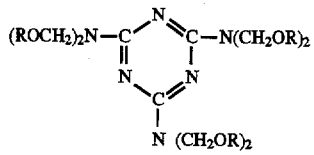

wherein R is the following:

R=CH₃ (Cymel® 300, 301, 303);

R=CH₃, C₂H₅ (Cymel® 1116);

R=CH₃, C₄H₉ (Cymel® 1130, 1133);

R=C₄H₉ (Cymel® 1156); or

R=CH₃H (Cymel® 370, 373, 380, 385)

The preferred melamine is hexamethoxymethyl melamine.

Benzoguanamine based resins

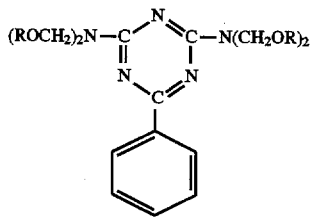

wherein

R=CH₃, C₂H₅ (Cymel® 1123)

Urea based resins

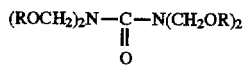

wherein

R=CH₃, H (Beetle™ 60, Beetle™ 65); or

R=C₄H₉ (Beetle™ 80).

Gycoluryl based resins

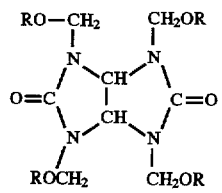

wherein:

R=CH₃, C₂H₅ (Cymel® 1171); or

R=C₄H₉ (Cymel® 1170).

In the present invention, the ratio of the active crosslinking groups, e.g., methylol(alkoxymethyl) groups of the amino crosslinking agent to the terminal hydroxy groups on the curable components is desirably from about 1.0:1.0 to 15.0:1.0, more preferably from about 1.5:1.0 to 5.0:1.0, most preferably from about 1.5:1.0 to 4.0:1.0.

On a weight basis, the amount of amino crosslinking agent effective for curing the crosslinkable binder generally ranges from about 3 to about 60 percent by weight, more preferably from about 10 to about 50 percent by weight based on the combined weight of the amino crosslinking agent, polymer and any other crosslinkable polymer constituent of the composition. In general, quantities of crosslinking agent required to cure the composition are inversely proportional to the number average molecular weight of the base polymer. Quantities of crosslinking agent on the higher side of this range are required to properly cure polymer compositions having a relatively low number average molecular weight, e.g., from about 250 to about 3,000, whereas lesser amounts of the crosslinking agent are required to properly cure polymers having a higher number average molecular weight, e.g., from about 3,000 up to about 20,000.

The composition of the invention may also be cured using one or more multi-isocyanate crosslinking agents. Examples of such materials include aromatic and aliphatic di- or polyisocyantes of the type disclosed in U.S. Pat. No. 4,331, 782, the complete disclosure of which is incorporated herein by reference.

The quantity of crosslinking agent required to cure the base polymer depends upon equivalent weight per hydroxyl of the base polymer. For bis-hydroxyl functional polymers (polyesters), the equivalent weight is equal to one-half the molecular weight. For polyfunctional polymers (acrylics), the independent weight is essentially independent of molecular weight and depends on the concentration of hydroxyl functional monomer in the polymer or copolymer structure.

In general, the crosslinking agent and the ester reaction product of formula A above are present in the composition at a respective weight ratio of from about 40 to 75 parts by weight of crosslinking agent per 60 to 25 parts by weight of ester reaction product, more preferably from 50 to 70 parts by weight of the former per 50 to 30 parts by weight of the latter.

The present invention also provides for a novel coating composition formed by combining the oligomeric or polymer component, the phenol carboxylic acid/epoxy reaction product component, the crosslinking agent, and optionally a solvent. Application of the formulated coating can be made via conventional methods such as spraying, roller coating, dip coating, etc., and then the coated system may be cured by baking.

Suitable optional solvents which may be included in the curable compositions of the invention comprise toluene, xylene, ethylbenzene, tetralin, naphthalene, and solvents which are narrow cut aromatic solvents comprising C₈ to C₁₃ aromatics such as those marketed by Exxon Chemical Company under the name Aromatic 100, Aromatic 150, and Aromatic 200.

Other suitable solvents include acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols.

Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, and like materials. Other such solvents include alkyl esters such as ethyl acetate, n-propyl acetate, butyl acetate, amyl acetate, mixtures of hexyl acetates such as sold by Exxon Chemical Company under the name EXXATE® 600 and mixtures of heptyl acetates sold under the name EXXATE® 700. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% by weight and a most preferred range between about 10 and 40% by weight. For the preparation of high solids coatings, the amount of solvent used in the coating formulation is preferably less than 40% of the weight of the formulation.

Pigments are a further component which may be present in the curable compositions of this invention. They are generally included at a weight ratio in the range of from about 0.5 to about 5.0 to one pigment-to-binder ratio, the term binder referring to the total weight of polymer plus crosslinking agent.

Suitable pigments which may be included in the compositions of this invention are those opacifying pigments normally used in paint and coating formulations and include titanium dioxide, zirconium oxide, zircon, zinc oxide, iron oxides, antimony oxide, carbon black, as well as chrome yellows, greens, oranges, mixed metal oxides, ceramic pigments and the like. Preferred pigments include rutile $TiO_2$ and particularly weather resistant coated types of $TiO_2$. The pigments may also be blended with a suitable extender material which does not contribute significantly to hiding power. Suitable extenders include silica, barytes, calcium sulfate, magnesium silicate (talc), aluminum oxide, aluminum hydroxide, aluminum silicate, calcium silicate, calcium carbonate (mica), potassium aluminum silicate and other clays or clay-like materials.

Satisfactory baking schedules for formulations of the present invention vary widely including, but not limited to, low temperature bakes of about 20 to 30 minutes at temperatures between 90° and 105° C. for large equipment applications and high temperature bakes of about 5 to 10 seconds in 300° to 375° C. air for coil coating applications. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phosphorous acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-CURE®. Examples of blocked catalysts are the King Industries, Inc. products with the tradename NACURE®.

The amount of catalyst employed typically varies inversely with the severity of the baking schedule. In particular, smaller concentrations of catalysts are usually required for higher baking temperatures or longer baking times. Typical catalyst concentrations for moderate baking conditions (15 to 30 minutes at 150° C.) would be about 0.2 to 0.5 wt % catalyst solids per polymer plus crosslinking agent solids. Higher concentrations of catalyst up to about 2 wt % may be employed for cures at lower temperature or shorter times. Formulations containing sufficient residual esterification catalyst, such as phosphorous acid, may not require the inclusion of any additional crosslinking catalyst to effect a proper cure at lower curing temperatures.

In the case of formulations of this invention containing hexamethoxymethyl melamine as the crosslinking agent and p-toluene sulfonic acid as the catalyst, preferred curing conditions at dry film thickness of about 1 mil are catalyst concentration between about 0.05 and 0.6 wt %, based on polymer solids plus crosslinking agent solids, baking temperature between 90° and 210° C. and baking time between about 5 and 60 minutes. Most preferred curing conditions are catalyst concentration between about 0.05 and 0.5 wt. %, baking temperature between about 120° and 180° C. and baking time between about 5 and 40 minutes.

As described above, the formulations of this invention are characterized by improved weather resistance. However, additional improvements in this and other properties can be achieved by including stabilizers and stabilizing systems into the formulation. Among compounds providing improvements in weather resistance are HALS (hindered amine light stabilizers), UV-screeners, and other antioxidants. Flow modifiers, rheology modifiers, pigment dispersants and the like may also be included in the composition.

Coating formulations of the present invention may be prepared by first forming a mill base. The mill base may be prepared by grinding a mixture of pigment, resin and solvent in a high speed disc disperser such as Byk-Gardner DISPERMAT® Model CV to form a pigment concentrate. This mill base is then let down (mixed) under mixing conditions with the remaining components of the formulation which include additional resin, solvent, crosslinking agent, and the catalyst.

The coating compositions of the invention may be applied to substrates by any suitable conventional technique such as spraying, roller coating, dip coating and the like. The composition may be applied in liquid form, and preferably is dispersed in an organic solvent. Typical solvent concentrations in the formulations generally range from 0 to about 75% by weight, with a preferred range of between about 5 and 50% by weight and a most preferred range of between about 10 and 40% by weight.

The crosslink density and degree of crosslinking of the composition can be monitored by evaluating the impermeability of the cured coating to organic solvent. A suitable test for evaluating this property is MEK rub test as described in paragraph 5.2 of ASTM D3732. This test measures the number of double rubs of a swab soaked with methyl ethyl ketone (MEK) required to completely remove the cured coating from a substrate. Generally speaking, the coatings of this invention are crosslinked sufficiently such that MEK rub values of greater than about 5, more preferably of at least 15 and most preferably more than 50 or 100 are achieved.

Properly formulated binder paints and coatings comprising compounds of structure A above provide at least one of the improvements listed below:

improved hardness-flexiblity balance
lower VOC at a workable viscosity
improved adhesion
improved anti-corrosive properties
improved solvent resistance
improved oxidative and/or radiation resistance
improved electric resistance
improved weather resistance The following examples illustrate the preparation of some preferred hardening agents and their use as a blend component in forming the curable polymer compositions of the invention. Materials identified in the examples by trade names are as follows:

GLYDEXX™N-10—glycidal ester of a mixture of tertiary aliphatic acids having 9–11 carbon atoms available from Exxon Chemical Co.

GLYDEXX™ ND-101—Same as N-10, but less pure.

ARALDITE™DY-025—A $C_8$ glycidyl ether available from Ciba Geigy Corp.

CYRACURE™ 6216—A $C_{16}$ linear epoxy available from Union Carbide.

CARGILL™57-5789—A hydroxy functional polyester having a molecular weight of 900–1,000 available from McWhorter Corp.

CARGILL™57-5742—A short oil tofa-based alkyd resin also available from McWhorter Corp.

RUCOFLEX™S107-210—Neopentyl glycol adipate diester oligomer having a molecular weight of about 560.

MIAK—Methyl isoamyl ketone

SOLVENT MIX—A mixture of methyl ethyl ketone, butyl acetate, xylene, butanol and EXXATE®600 present at a respective weight ratio of 2:3:3:1:1.

HMMM—Hexamethoxymethyl melamine crosslinking agent.

BYK™300—Silicone flow control agent from Byk-Chemie.

DC-57—Silicone flow control agent from Dow Corning.

BYK™ 451—Amine blocked p-toluene sulfonic acid catalyst from Byk-Chemie.

NACURE™2500—Blocked p-toluene sulfonic acid catalyst from King Industries.

Examples 1–4 below illustrate the preparation of four different ester reaction products of PHBA and various epoxy compounds, and the properties of each.

EXAMPLE 1

Synthesis of Glycidyl Ester+PHBA

Into a 1 liter flask equipped with agitation, nitrogen, heating and temperature probe, 326.6 g Glydexx® N-10 glycidyl ester and 173.4 g parahydroxy benzoic (PHBA) were charged. The mixture was heated at 110° C. At that point, an exothermic reaction takes place. The maximum temperature reached was 160° C. At this point, the solution was clear. The solution was then cooled and discharged. Physical properties are given below.

| | |
|---|---|
| Acid Number | 0 mg KOH/gram |
| Hydroxyl Number | 301.0 mg KOH/gram |
| NVM | >99% |
| Color | <3 Gardner |

EXAMPLE 2

Synthesis of Glycidyl Ester & PHBA

Into a 3 liter flask equipped with heating agitation and nitrogen 326.6 g Glydexx® ND-101 and 173.4 g parahydroxybenzoic acid (PHBA) were charged. The mixture was heated to 110° C. with agitation. At approximately 110° C. an exothermic reaction occured. The mixture turned from a cloudy solution to a clear solution as the temperature approached a maximum of 158° C. The solution was cooled back to room temperature. Physical characteristics are given below.

| | |
|---|---|
| Acid Number | 2.5 mg KOH/gram |
| Hydroxyl Value | 417-mg KOH/gram |
| NVM | 98.8 Wt. % |
| Color | <3 Gardner |

EXAMPLE 3

Synthesis of Glycidyl Ether+PHBA 200 g Araldite® DY025 and 87.6 g PHBA were charged into a 1 liter flask equipped with agitation, heating and nitrogen. The mixture was heated to 135° C. At 135° C. an exothermic reaction occured. The maximum temperature reached was 172° C. At about 158° C., the solution turned from cloudy to clear. The reaction was then cooled back to room temperature. Physical characteristics are given below.

| | |
|---|---|
| TAN | 9.8 mg KOH/gram |
| Hydroxyl Number | 360.0 mg KOH/gram |
| NVM | 96.01 wt % |

EXAMPLE 4

Synthesis of Linear Epoxy+PHBA 250 g Cyracure® 6216 and 124.2 g parahydroxy-benzoic acid were charged into a 1 liter flask equipped with agitation, heating and nitrogen. The reaction was heated to 150° C. At that temperature an exothermic reaction occurred and the temperature increased to 159° C. The temperature was held at 160° C. The solution turned clear. To drive the reaction to completion, the solution was maintained at 170° C. for four hours. The solution was then cooled to room temperature. Physical properties are given below.

| | |
|---|---|
| TAN | 10.5 mg KOH/gram |
| Hydroxyl Number | 294.0 mg KOH/gram |
| NVM | 97.4% |

Paint formulations having compositions as set forth in the following examples were prepared by forming a mill base composition and a let down composition by the general procedure described above.

Test panels were prepared and evaluated as follows:

Thin films of the various formulations were applied to steel test panels via drawdowns. The basic procedures are outlined in ASTM Test Procedure D823-87. Test panels are either untreated Type S cold rolled steel panels obtained from the Q-Panel Company or polished Bonderite™ 1000 (iron-phosphate treatment) panels obtained from Advanced Coatings Technology Inc. Panels sizes are either 4"×8" or 3"×6".

Wire-wound drawdown rods and in some cases a Precision Laboratory Drawdown Machine (both from the Paul N. Garnder Company) are used to apply films via hand-pulled drawdowns (Method E). Target dry film thicknesses are 1 mil.

The film property evaluations conducted on all cured panels were as follows:

Knoop Hardness—ASTM D-1474
Direct Impact—ASTM D-2794
Reverse Impact—ASTM D-2794
VOC—EPA Method 24
Pencil Hardness—ASTM D-3363
Flexibility (T-bend)—ASTM D-1737

Adhesion—ASTM D-3359
Corrosion Resistance (Salt Spray)—ASTM B-117
MEK Rubs—ASTM D-3732
Weathering (QUV)—ASTM G-53
Sag Resistance—ASTM D-4400

In the case of the impact tests, a ⅝ inch punch with a 0.64 inch die was employed.

EXAMPLE 5 (Control)

A polyester paint was formulated as follows:

|  | Amount (g) |
|---|---|
| Millbase |  |
| Polyester (Cargill 57-5789) | 15.8 |
| TiO$_2$ | 32.6 |
| MIAK | 1.6 |
| Let Down |  |
| Polyester (Cargill 57-5789) | 21.7 |
| HMMM | 9.0 |
| BYR 451 | 0.8 |
| BYK 300 | 0.1 |
| MIAK | 15.0 |

The resulting paint had a measured volatile organic compound (VOC) content of 3.2 lb/gal. at a viscosity 29.8 seconds (Zahn Cup #2).

The paint was baked at 177° C. for 10 minutes. One mil dry film thickness paints were drawn on Bonderite 1000 panels. The results are given below.

| Dry Film Testing |  |
|---|---|
| Pencil Hardness | 2H |
| Knoop Hardness | 17.7 |
| Direct Impact (lb-in) | 160 |
| T-bend (no pick) | 2 T |
| Adhesion | 5 |
| Corrosion Resistance, Blistering (Salt spray, 144 hrs.) | 6 |
| MEK Double Rubs | 200 |
| Gloss 60° | 97 |
| Sag Resistance (mils) | 1.3 |

EXAMPLE 6

The formulated paint of Example 5 was modified by adding the reaction product of para-hydroxy benzoic acid (PHBA) and Glydexx® N-10 glycidyl ester made as described in Example 1.

|  | Amount (g) |
|---|---|
| Millbase |  |
| Polyester (Cargill 57-5789) | 15.8 |
| TiO$_2$ | 32.6 |
| MIAK | 1.6 |
| Let Down |  |
| Polyester (Cargill 57-5789) | 14.2 |
| HMMM | 11.3 |
| Ex. 1 reaction product | 4.1 |
| BYK 451 | 0.8 |
| BYK 300 | 0.1 |
| MIAK | 14.2 |

The paint which had a measured VOC content of 3.0 lb/gal. at a viscosity of 28.4 seconds (Zahn #2), was baked at 177° C. for 10 minutes. One mil dry film thickness paints were drawn on Bonderite 1000 panels. Test results are given below.

| Dry Film Testing |  |
|---|---|
| Pencil Hardness | 2H |
| Knoop Hardness | 19.6 |
| Direct Impact (lb-in) | 160 |
| T-bend (no pick) | 2 T |
| Adhesion | 5 |
| Corrosion Resistance, Blistering (Salt Spray, 144 hrs.) | 10 |
| MEK Double Rubs | 200 |
| Gloss 60° | 98 |
| Sag Resistance (mils) | >1.4 |

EXAMPLE 7 (Control)

The following paint was made using a short oil Tofa alkyd.

|  | Amount (g) |
|---|---|
| Millbase |  |
| Alkyd (Cargill 57-5742) | 15.0 |
| TiO$_2$ | 34.1 |
| MIAK | 1.8 |
| Let Down |  |
| Alkyd (Cargill 57-5742) | 20.6 |
| HMMM | 10.7 |
| BYK 451 | 0.8 |
| BYK 300 | 0.1 |
| MIAK | 16.9 |

The resulting paint had a measured VOC content of 3.1 lb/gal. at a viscosity of 25.0 seconds (Zahn #2). Panels were made by drawing down the paint on Bonderite 1000 panels. The panels were cured at 177° F. for 10 minutes. The physical properties of the paint are given below.

| Dry Film Testing |  |
|---|---|
| Pencil Hardness | 2H |
| Knoop Hardness | 16.5 |
| Direct Impact (lb-in) | 70 |
| T-bend (no pick) | 4 T |
| Adhesion | 5 |
| MEK Double Rubs | 200 |
| Gloss 60° | 99 |

EXAMPLE 8

The alkyd formulation of control Example 7 was modified by including the reaction product prepared in Example 1 in the formulation.

|  | Amount (g) |
|---|---|
| Millbase |  |
| Alkyd (Cargill 57-5742) | 15.0 |
| TiO$_2$ | 34.1 |
| MIAK | 1.8 |
| Let Down |  |
| Alkyd (Cargill 57-5742) | 13.5 |

|  | Amount (g) |
|---|---|
| HMMM | 12.7 |
| Ex. 1 Reaction Product | 4.2 |
| BYK 451 | 0.8 |
| BYK 300 | 0.1 |
| MIAK | 15.8 |

The resulting paint had a measured VOC content of 2.9 lb/gal. at a viscosity of 25.7 seconds (Zahn #2). Painted panels were made by drawing down the paint onto Bonderite 1000 panels and baking the panels for 10 minutes at 177° C. One mil dry film thickness paints were made. The properties of the paint are given as follows:

| Dry Film Testing | |
|---|---|
| Pencil Hardness | 2H |
| Knoop Hardness | 18.4 |
| Direct Impact (lb-in) | 80 |
| T-bend (no pick) | 4 T |
| Adhesion | 5 |
| MEK Double Rubs | 200 |
| Gloss 60° | 100 |

EXAMPLE 9 (Control)

A low VOC paint was made using Rucoflex S-107-210 polyester diol. The following formulation was used.

|  | Amount (g) |
|---|---|
| Polyester Diol (Rucoflex ® S-107-210) | 35.0 |
| HMMM | 17.5 |
| Nacure ® 2500 | 0.5 |
| Solvent Mix | 6.7 |
| Dow Corning ® DC-57 | 0.1 |

The resulting paint had a measured VOC content of 1.8 lbs/gal. at a viscoslity of 21.7 seconds (Zahn #3). A one mil dry film thickness paint was applied on Bonderite 1000 panels. The panels were cured for 10 minutes at 177° C. Results are given below:

| Dry Film Testing | |
|---|---|
| Pencil Hardness | F |
| Direct Impact (lb-in) | 120 |
| T-bend (no pick) | 4 T |
| Adhesion | 3 |
| MEK Double Rubs | 200 |

EXAMPLE 10

A paint was made by replacing 20% of the binder in Example 9 with the reaction product prepared in Example 1. The formulation used was as follows:

|  | Amount (g) |
|---|---|
| Polyester Diol (Rucoflex ® S-107-210) | 28.0 |
| HMMM | 19.0 |
| Ex. 1 Reaction Product | 5.0 |
| Nacure 2500 | 0.5 |

|  | Amount (g) |
|---|---|
| Solvent mix | 7.9 |
| Dow Corning DC-57 | 0.1 |

The resulting paint had a measured VOC content of 1.9 lbs/gal. at a viscosity of 21.9 seconds (Zahn #3). A one mill thick dry film was applied to Bonderite 1000 panels. The panels were cured for 10 minutes at 177° C. Test results were as follows:

| Dry Film Testing | |
|---|---|
| Pencil Hardness | 3H |
| Direct Impact (lb-in) | 140 |
| T-bend (no pick) | 4 T |
| Adhesion | 3 |
| MEK Double Rubs | 200 |

EXAMPLE 11

The polyesterdiol formulation of Example 9 was modified by addition of the reaction product of Example 2 as follows:

|  | Amount (g) |
|---|---|
| PE Diol (Rucoflex ® S-107-210) | 28.0 |
| Ex. 2 Reaction Product | 5.05 |
| HMMM | 19.0 |
| Nacure 2500 | 0.25 |
| DC ®-57 | 0.1 |
| Solvent Mix | 7.15 |

The resultant paint had a measured VOC content of 2.1 lbs/gal. and a viscosity of 22.9 seconds (Zahn #3). One mil dry thickness paint was applied to Bonderite 1000 panels. The panels were cured for 10 minutes at 177° C. Test results are as follows:

| Dry Film Testing | |
|---|---|
| Pencil Hardness | H |
| Direct Impact (lb-in) | 140 |

EXAMPLE 12

The polyester diol formulation of Example 9 was modified by the addition of the reaction product of Example 3 as follows:

|  | Amount (g) |
|---|---|
| PE Diol (Rucoflex ® S-107-210) | 28.0 |
| HMMM | 20.0 |
| Ex. 3 Reaction Product | 5.20 |
| Nacure 2500 | 0.65 |
| DC ® 57 | 0.10 |
| Solvent Mix | 7.20 |

The resulting paint had a measured VOC content of 1.8 lbs/gal. and a viscosity of 22.1 seconds (Zahn #3). One mil dry film thickness paint was applied to Bonderite 1000 panels. The panels were baked for 10 minutes at 177° C. Results are as follows:

| Dry Film Testing | |
| --- | --- |
| Pencil Hardness | H |
| MEK Double Rubs | 100 |

EXAMPLE 13

The polyester diol formulation of Example 9 was modified by the addition of the reaction product of Example 4, as follows:

| | Amount (g) |
| --- | --- |
| PE Diol (Rucoflex ® S-107-210) | 28.0 |
| HMMM | 19.0 |
| Ex. 4 Reaction Product | 5.20 |
| Nacure 2500 | 0.65 |
| DC ® 57 | 0.10 |
| Solvent Mix | 7.35 |

The resulting paint had a measured VOC content of 1.9 lb/gal. and a viscosity of 24.8 seconds (Zahn #3). One mil dry film thickness paint was applied to Bonderite 1000 panels. The panels were baked for 10 minutes at 177° C.

| Dry Film Testing | |
| --- | --- |
| Pencil Hardness | 2H |
| Direct Impact (lb-in) | 100 |
| MEK Double Rubs | 200 |

Comparative Example 14

This example which is outside the scope of the present invention illustrates the preparation of a composition of the type described in Example 5 of U.S. Pat. No. 5,166,289 wherein neopentyl glycol-bis para-hydroxybenzoic acid is used as a hardener component.

The paint formulation of Example 9 was modified by inclusion of NPG-bis PHBA in the composition, as follows:

| Millbase | Amount (g) |
| --- | --- |
| PE Diol (Rucoflex ® S-107-210) | 31.5 |
| HMMM | 18.0 |
| NPG-bis PHBA | 4.0 |
| Nacure 2500 | 0.32 |
| DC ® 57 | 0.1 |
| Solvent Mix | 8.7 |

The resulting paint had a VOC content of 2.1 lbs/gal. and a viscosity of 24.8 seconds (Zahn #3). One mil dry film thickness paint was applied to Bonderite 1000 panels. The panels were baked for 10 minutes at 177° C. Test results are as follows:

| Pencil Hardness | 2H |
| --- | --- |
| Direct Impact (lb-in) | 160 |

Analysis of the test results of the examples demonstrates that formulations within the scope of this invention have hardness and impact properties comparable to those achieved in U.S. Pat. No. 5,166,289 and, at the same time, may be made from formulations having a lower content of volatile organic compounds and workable viscosities in the range of about 20–30 Zahn seconds.

The coatings and paints of the invention can be used for spray, roller or dip application to various metal surfaces such as automotive surfaces, building panels, metal furniture, appliances and other metal surfaces and for coil coating applications, followed by suitable baking to provide hard, durable and decorative finishes.

What is claimed is:

1. A crosslinkable coating composition comprising a mixture of:
   a. a poly(oligo)meric polymer component selected from the group consisting of di(poly)esters, polyesters, alkyd resins, acrylic resins, polyether polymers polycarbonate resins, and poly(oligo)mers which contain a combination of two or more of ester, ether, carbonate, acrylic and alkyd moieties in their structure, said polymeric component further characterized as having a number average molecular weight within the range of about 250 to about 20,000; and
   b. a phenolic ester alcohol which has only one phenol group having at least one reactive phenolic hydroxyl, wherein the phenolic ester alcohol also has at least one aliphatic hydroxyl group and at least one ester group, the phenolic hydroxyl and aliphatic hydroxyl being effective for reaction with a crosslinker to cure the coating composition into a cured coating.

2. The composition of claim 1 which further contains: (c) a crosslinking agent for said polymer component.

3. The composition of claim 2, wherein the phenolic ester alcohol is the reaction product of a phenol carboxylic acid and an epoxy-functional compound and said crosslinking agent is a methylol(alkoxymethyl)amino crosslinking agent present in an amount effective to crosslink the composition.

4. The composition of claim 1 wherein said phenolic ester alcohol has the structure:

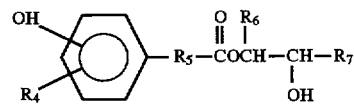

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical, $R_6$ is hydrogen or a $C_1$ to $C_{20}$ organic radical which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms or an aromatic group containing 6 to 20 carbon atoms, $R_{10}$ is a primary, secondary or tertiary aliphatic group containing 4 to 20 carbon atoms or an aromatic group containing 6 to 20 carbon atoms, and $R_{11}$ is a $C_2$ to $C_{20}$ organic radical which may form with $R_6$ part of a 5 or 6 carbon atom cyclic ring structure.

5. The composition of claim 4 wherein $R_4$ and $R_6$ are each hydrogen, $R_5$ is a direct bond and $R_7$ is selected from the group consisting of $CH_2OH$, a hydrocarbon moiety containing 3 to about 20 carbon atoms and an organic moiety containing ester or ether groups and containing from 3 to about 20 carbon atoms.

6. The composition of claim 3 wherein said phenol carboxylic acid is a hydroxybenzoic acid.

7. The composition of claim 3 wherein said epoxy functional compound is a glycidyl ether or ester containing a terminal epoxy group.

8. The composition of claim 3 wherein said phenol carboxylic acid is para-hydroxybenzoic acid.

9. The composition of claim 3 wherein said ester reaction product has a molecular weight in the range of from about 250 to about 1000.

10. The composition of claim 3 wherein said ester reaction product is the reaction product of para-hydroxybenzoic acid and a glycidyl ester of one or a mixture of aliphatic acids containing 5 to 13 carbon atoms.

11. The composition of claim 10 wherein said reaction product is the gylcidyl ester of an aliphatic acid containing an average of 9 to 11 carbon atoms.

12. The composition of claim 3 wherein said ester reaction product is present in said composition at a level of from about 1 to about 60% by weight based on the combined weight of said polymer and amino crosslinking agent taken together.

13. The composition of claim 12 wherein said ester reaction product is present at a level of from about 2 to about 30% by weight, based on the combined weight of said polymer and amino crosslinking agent taken together.

14. The composition of claim 3 wherein said polymeric component has a number average molecular weight within the range of about 250 to about 10,000.

15. The composition of claim 14 wherein said molecular weight is in the range of from about 250 to about 6,000.

16. The composition of claim 3 wherein said polymeric component is a diester or polyester polymer having the structure:

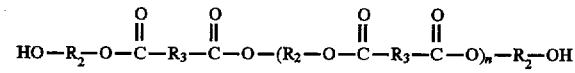

wherein n is 0 or an integer ranging from 1 to about 40, $R_2$ is a divalent aliphatic or cycloaliphatic radical containing from 2 to about 40 carbon atoms or a mixture of such radicals, and $R_3$ is a divalent aliphatic, cycloaliphatic or aromatic radical containing from 2 to about 40 carbon atoms, or a mixture of such radicals.

17. The composition of claim 16 wherein n is 0.

18. The composition of claim 16 wherein n ranges from 1 to about 40.

19. The composition of claim 3 wherein said polymeric component is an alkyd resin.

20. The composition of claim 3 wherein said polymeric component is a polycarbonate polymer having the structure:

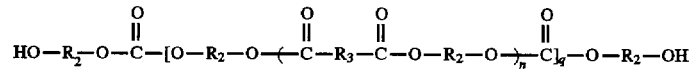

wherein q is an integer ranging from 1 to about 40, n is an integer ranging from 0 to 40, $R_2$ is a divalent aliphatic or cycloaliphatic radical containing from 2 to about 40 carbon atoms or a mixture of such radicals and $R_3$ is a divalent aliphatic, cycloaliphatic or aromatic radical containing from 2 to about 40 carbon atoms, or a mixture of such radicals.

21. The composition of claim 17 wherein said polymeric component is the diester condensation product of neopentyl glycol and adipic acid present in a respective molar ratio of about 2 to 1.

22. The composition of claim 18 wherein said polymeric component is the polyester condensation product of neopentyl glycol and adipic acid, present at a respective molar ratio of p+1 to p wherein p is the number of moles of adipic acid.

23. The composition of claim 3 wherein said methylol (alkoxymethyl)amino crosslinking agent is present at a level of from about 3 to about 60 percent by weight, based on the combined weight of crosslinking agent and crosslinkable polymer components.

24. The composition of claim 23 wherein said amino crosslinking agent is hexamethoxymethyl melamine or hexaethoxymethyl melamine.

25. The composition of claim 3 further containing an organic solvent.

26. The composition of claim 3 further containing pigment.

27. A process for preparing a cured coating composition comprising:

a. applying the coating composition of claim 1 to a substrate;

b. drying said coating; and c. heating said coated substrate for a time and a temperature sufficient to cure said coating.

28. The process of claim 27 wherein said coating composition contains an organic solvent.

29. A cured coating composition prepared by the process of claim 27.

30. A process for preparing a crosslinkable coating composition comprising forming a mixture comprising:

a. a poly(oligo)meric polymer component selected from the group consisting of di(poly)esters, polyesters, alkyd resins, acrylic resins, polyether polymers, polycarbonate resins, and poly(oligo)mers which contain a combination of two or more of ester, ether, carbonate, acrylic and alkyd moieties in their structure, said polymeric component further characterized as having a number average molecular weight within the range of about 250 to about 20,000;

b. a phenolic ester alcohol which is an ester reaction product of a phenol carboxylic acid and mono glycidyl compound; and c. a crosslinking agent for said polymer component.

31. The process of claim 30 wherein said crosslinking agent is a methylol(alkoxymethyl)amino crosslinking agent present in an amount effective to crosslink the composition.

32. The process of claim 31 wherein said ester reaction product has the structure:

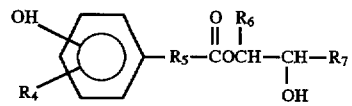

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical, $R_6$ is hydrogen or a $C_1$ to $C_{20}$ organic radical which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms or an aromatic group containing 6 to 20 carbon atoms, $R_{10}$ is a primary, secondary or tertiary aliphatic group containing 4 to 20 carbon atoms or an aromatic group containing 6 to 20 carbon atoms, and $R_{11}$ is a $C_2$ to $C_{20}$ organic radical which may form with $R_6$ part of a 5 or 6 carbon atom cyclic ring structure.

33. The process of claim 32 wherein $R_4$ and $R_6$ are each hydrogen, $R_5$ is a direct bond and $R_7$ is selected from the group consisting of $CH_2OH$, a hydrocarbon moiety containing 3 to about 20 carbon atoms and an organic moiety containing ester or ether groups and containing from 3 to about 20 carbon atoms.

34. The process of claim 33 wherein said phenol carboxylic acid is para-hydroxybenzoic acid.

35. The process of claim 33 wherein said ester reaction product is the reaction product of para-hydroxybenzoic acid and a glycidyl ester of one or a mixture of aliphatic acids containing 5 to 13 carbon atoms.

36. A crosslinkable coating composition comprising a mixture of:
  a. a poly(oligo)meric polymer component selected from the group consisting of di(poly)esters, polyesters, alkyd resins, acrylic resins, polyether polymers polycarbonate resins, and poly(oligo)mers which contain a combination of two or more of ester, ether, carbonate, acrylic and alkyd moieties in their structure, said polymeric component further characterized as having a number average molecular weight within the range of about 250 to about 20,000; and
  b. a phenolic ester alcohol which is a reaction product of a phenol carboxylic acid and a mono glycidyl compound selected from the group consisting of a mono glycidyl ether and mono glycidyl ester.

37. The crosslinkable coating composition as recited in claim 36 wherein the phenolic ester alcohol has a molecular weight in the range of from about 250 to about 100.

38. The crosslinkable coating composition recited in claims 36 or 37 wherein the phenol carboxylic acid is hydroxybenzoic acid.

39. The crosslinkable coating composition recited in claim 38 wherein the phenol carboxylic acid is para-hydroxybenzoic acid.

40. The crosslinkable coating composition recited in claims 36 or 37 wherein the mono glycidyl compound is a glycidyl ester having the formula

wherein $R_{10}$ is a primary, secondary or tertiary aliphatic group having 4 to 20 carbon atoms.

41. The crosslinkable coating composition recited in claim 38 wherein the mono glycidyl compound is a glycidyl ester having the formula

wherein $R_{10}$ is a primary, secondary or tertiary aliphatic group having 4 to 20 carbon atoms.

42. A crosslinkable coating composition comprising a mixture of:
  a. a polymer component having a number average molecular weight within the range of about 250 to about 20,000 and having a hydroxyl functionality which is effective for reaction with a crosslinker; and
  b. a phenolic ester alcohol having the structure

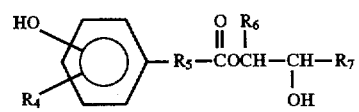

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical, $R_6$ is hydrogen or a $C_1$ to $C_{20}$ organic radical which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$ and $R_{11}$ wherein $R_9$ is a primary or secondary aliphatic group containing 3 to 20 carbon atoms or an aromatic group containing 6 to 20 carbon atoms, $R_{10}$ is a primary, secondary or tertiary aliphatic group containing 4 to 20 carbon atoms or an aromatic group containing 6 to 20 carbon atoms, and $R_{11}$ is a $C_2$ to $C_{20}$ organic radical which may form with $R_6$ part of a 5 or 6 carbon atom cyclic ring structure.

* * * * *